US008493998B2

(12) United States Patent
Rai et al.

(10) Patent No.: US 8,493,998 B2
(45) Date of Patent: Jul. 23, 2013

(54) METHOD AND APPARATUS FOR SCHEDULING FORWARD DATA BURSTS IN WIRELESS NETWORK

(75) Inventors: Vikram Rai, Randolph, NJ (US); Rui Adelino Silva, Westfield, NJ (US)

(73) Assignee: Alcatel Lucent, Paris (FR)

( * ) Notice: Subject to any disclaimer, the term of this patent is extended or adjusted under 35 U.S.C. 154(b) by 3092 days.

(21) Appl. No.: 10/717,065

(22) Filed: Nov. 19, 2003

(65) Prior Publication Data

US 2005/0105493 A1    May 19, 2005

(51) Int. Cl.
*H04J 3/16* (2006.01)
*H04J 3/22* (2006.01)
*H04J 3/24* (2006.01)
*H04B 7/216* (2006.01)
*H04B 7/00* (2006.01)
*H04W 72/00* (2009.01)

(52) U.S. Cl.
USPC ........... 370/468; 370/443; 370/477; 370/479; 455/450; 455/509

(58) Field of Classification Search
USPC .......... 370/468, 441, 443, 477, 479; 455/450, 455/452.1, 452.2, 509
See application file for complete search history.

(56) References Cited

U.S. PATENT DOCUMENTS

| 6,631,125 | B1 | 10/2003 | Longoni et al. ............... 370/341 |
| 6,724,740 | B1 * | 4/2004 | Choi et al. .................... 370/335 |
| 6,850,509 | B2 | 2/2005 | Lee et al. |
| 6,920,119 | B2 * | 7/2005 | Rinchiuso ..................... 370/329 |
| 7,158,504 | B2 * | 1/2007 | Kadaba et al. ................ 370/348 |
| 2001/0021180 | A1 | 9/2001 | Lee et al. ...................... 370/336 |
| 2002/0105929 | A1 | 8/2002 | Chen et al. .................... 370/335 |
| 2003/0073443 | A1 * | 4/2003 | Bae et al. ...................... 455/450 |
| 2006/0114910 | A1 * | 6/2006 | Sindhushayana et al. .... 370/394 |

FOREIGN PATENT DOCUMENTS

| JP | 2003152630 A | 5/2003 |
| WO | 0235735 A2 | 5/2002 |

OTHER PUBLICATIONS

European Search Report.

* cited by examiner

*Primary Examiner* — Un C Cho
(74) *Attorney, Agent, or Firm* — Carlson, Gaskey & Olds PC

(57) ABSTRACT

In a 3G CDMA2000 network, permanent virtual pipes of different data rates (153.6 kbps, 76.8 kbps, 38.4 kbps and 19.2 kbps, for example) are provisioned at a base station on the Forward Supplemental Channel (F-SCH) for the transmission of data bursts to requesting mobile terminals by allocating and grouping together a set of resources (i.e., contiguous Walsh codes, contiguous ASIC real estate, etc.). Data bursts arriving from the network are scheduled onto timeslots on all the pipes in a manner such that at least one burst segment of each active burst is scheduled into a timeslot on the highest data rate pipe. The other burst segments of a burst are scheduled onto all the pipes so they migrate through the various rate pipes in order to give all bursts opportunities on the higher rate pipes.

13 Claims, 9 Drawing Sheets

METHOD AND APPARATUS FOR SCHEDULING FORWARD DATA BURSTS IN WIRELESS NETWORK

TECHNICAL FIELD

This invention relates to wireless communications and, more particularly, to the efficient management of radio link resources on a wireless network.

BACKGROUND OF THE INVENTION

CDMA-based wireless communications networks were introduced as a second generation (2G) system based on digital technologies as compared to first generation systems that used analog transmission technology. 2G systems also introduced support for low-speed data transmission on top of their support for voice calls. The push to third generation (3G) systems has high-speed data transmission as one of its driving forces. A 3G CDMA2000 system will support transmission of data at rates of 19.2 kbps, 38.4 kbps, 76.8 kbps and 153.6 kbps (and even higher), referred to as 2×, 4×, 8× and 16×, respectively, to allow transmission of images, digital files, video, etc. These high-speed data channels, which are established between the base station and the mobile terminal, can transmit data in both directions. Data sent from the base station (BS) to the mobile terminal is referred to as being sent in the "forward" direction, while data from the mobile to the base station is referred to as being sent in the "reverse" direction. The wireless links or channels used to transmit the higher speed data between the base station and the mobile terminals are not permanent, but need to be established when the data is to be sent. High-speed data transmission between the base station and the mobile terminal is bursty in nature. Typically, data is not sent in a constant data stream, but instead is sent in a series of data bursts until transmission of the file, image, web page, etc. is complete. One reason that this mode of operation is used is that radio resources are limited and cannot simultaneously sustain servicing a plurality of mobile terminals that each have ongoing data sessions. In other words, using permanent dedicated channels utilizing these high-speed rates would only allow a base station to service a few mobiles due to radio resource limitations. Therefore, in order to service a plurality of mobile terminals, some form of resource sharing needs to be employed.

On a CDMA2000 wireless network, the high-speed data channels are called Supplemental Channels (SCHs). These supplemental channels exist for both forward and reverse directions, the F-SCH and R-SCH, respectively. When a burst is ready to be sent to a mobile terminal, the base station allocates some time on an F-SCH and informs the mobile terminal when the burst will start. This synchronization with the mobile terminal is performed through an ESCAM (Extended Supplemental Channel Assignment Message) that is transmitted by the base station on a control channel. The format of the ESCAM is defined in the IS-2000 standard, which is followed by designers of both stations and mobile terminals.

Scheduling data burst activity in a CDMA2000 wireless system is complex given that a plurality of mobile terminals may be simultaneously requesting bursts from a single base station. The complexity is present due to the fact that the high-speed wireless channels have to be shared and cannot be dedicated to each mobile terminal session, as noted above. Furthermore, a high-speed data channel is not a physical entity, but rather is a collection of independent resources each with a set of constraints that can vary over time and can also vary amongst base station configurations. The basic building blocks necessary to transmit data at high speeds are: (1) a contiguous set of Walsh codes; (2) contiguous channel fragments to drive the supplemental channel (i.e., some contiguous real estate on a CDMA2000 ASIC [Application Specific Integrated Circuit]); (3) some form of backhaul between the base station and the MSC (to deliver the high-speed data packets between the Mobile Switching Center (MSC) and the base station, or vice versa); and (4) some amount of RF power necessary to drive the supplemental channel and which can vary in strength depending on the location of the mobile terminal. All of these elements need to be available precisely when the BS transmits the burst to a given mobile terminal.

On top of this complexity is the scheduling complexity necessary to achieve fairness in simultaneously servicing the plurality of mobile terminals with a finite set of resources. Current methodology divides the resources into smaller and smaller pools and then distributes these small pools amongst the plurality of mobile terminals that are requesting service. The end result is that a mobile terminal will receive a lower speed burst (as low as 19.2 kbps), but many mobile terminals will get bursts simultaneously. Currently, this requires large amount of processing power given that this schema produces many smaller lower-rate channels. A new burst request arriving in an already loaded system requires the base station software to inspect many multiples of existing low-rate bursts to determine what resources are available for the new burst. Typically, in a loaded system, a new burst request will be given a low-rate of burst (19.2 kbps), and a large amount of processing power is required just to find the resources for this low-rate burst. Also, these resources move with each new burst request or burst continuation. Thus, when any new burst request is received, a new set of Walsh codes, ASIC channel fragments, etc., must be reserved.

As noted above, the prior art methodology of assigning resources addresses the resource sharing constraint by splitting the available resources into smaller and smaller pieces. As the number of requesting mobile terminals increases, the resources are partitioned into the smallest possible channels, which can only supply the 2× rate of 19.2 kbps. Many of these 2× channels are then handled in parallel. When a new burst request is received by an already heavily loaded system, it will either be denied or will get assigned a 2× channel at some later time. Furthermore, heavy processing is required to find the 2× resources that will be available at some time quanta in the future (the burst setup time) since there are so many small partitions of resources to check for availability. Even further, these resources are being checked for availability in the future since the burst will only be scheduled to start after the burst setup time has expired.

The prior art is also disadvantageously susceptible to leaving holes in the available resources. This results from the nature of the resource partitioning and the fact that there are constraints on certain resources being contiguous to each other (e.g., the Walsh codes). This is known as radio channel fragmentation. As the sharing scheme breaks the resources up, it cannot always put the resources back together at all times. Coalescing non-contiguous resources (e.g., Walsh codes, channel fragments) into single homogeneous contiguous resources is very complex and processor intensive. For example, there are times when two 2× channels are separately available that could be used to create a 4× burst if they were contiguous.

SUMMARY OF THE INVENTION

In accordance with an embodiment of the present invention, at system initialization, one or more permanent virtual pipes are provisioned at a base station in a CDMA2000 network on the Forward Supplemental Channel (F-SCH). A set of resources (i.e., contiguous Walsh codes, contiguous ASIC real estate, etc.) are allocated and grouped together to handle high-speed data transmissions in the forward direction from the base station on the F-SCH. Depending on the base station configuration, these virtual pipes that are provided are "wide" enough to handle data rates that vary, for example, from the maximum presently used 16× (153.5 kbps) data rate to the 2× (19.2 kbps) data rate. Virtual pipes that are 8× and 4× wide are also generally provisioned.

Once the virtual pipes have been provisioned, data bursts arriving from the network and destined to a mobile terminal in the base station's service area are scheduled into timeslots on at least one of the virtual pipes in a round-robin fashion. In particular, depending on the length of a burst, a burst is divided into burst segments of a timeslot duration and interleaved in a time-multiplex manner with segments of other bursts that are destined to other mobile terminals in the base station's service area. The amount of data transmitted in a given timeslot/burst segment is dependent on the particular virtual pipe on which that particular burst segment is scheduled for transmission. If there are less active bursts than there are number of virtual pipes, then the burst segments are scheduled onto only the widest pipes. Once, however, the number of active bursts exceeds the number of provided pipes, then the bursts segments are scheduled amongst the different width pipes in a round-robin manner with at least one burst segment of each active burst being scheduled into a timeslot on the widest pipe. The other burst segments of a burst are then scheduled onto all the pipes so they migrate through the various width pipes in order to give all bursts opportunities on the wider-width pipes.

A software-embodied burst segment control structure is associated with each provisioned virtual pipe. This control structure includes a frame head pointer list and a plurality of burst segment information blocks. Each information block is populated with information relating to an identified burst segment that is scheduled to be transmitted during a specific future timeslot on the associated virtual pipe, and is linked to a specific frame on the frame head pointer lists. As a current frame pointer moves at a fixed frame rate from frame head pointer-to-frame head pointer on the frame head pointer list, a determination is made whether the current frame head pointer is pointing to a burst segment information block of a burst segment that is then scheduled for transmission on the virtual pipe. If it is, the burst segment identified in the pointed-to burst segment information block is transmitted. After a burst segment has been transmitted, its associated burst segment information block is erased. As the current frame pointer moves frame-by-frame to each next frame head pointer, a future frame pointer moves frame-by-frame to a frame head pointer that the current frame pointer will not reach for a predetermined number of frames. When the future frame pointer points to a frame head pointer that in turn points to a burst segment information block for a burst segment that will be transmitted when the current frame pointer later reaches that frame, an ESCAM is transmitted on a control channel to prepare the receiving mobile terminal for the burst that it will be shortly receiving via the virtual pipe when the current frame pointer shortly reaches that same frame head pointer.

When the base station receives a burst request from the network, the first burst segment is scheduled on the widest virtual pipe at a determined time in the future after at least one of each currently scheduled burst segment has been transmitted. A burst segment information block is then populated and associated with the frame head pointer for that determined future time, while any other burst segments that have already been scheduled are shifted to accommodate the new burst segment. Other burst segments are similarly scheduled on the other provisioned virtual pipes at determined times in the future.

Advantageously, the high speed data channel resources are efficiently managed with the high speed data bursts being scheduled in such a fashion so as to achieve usage fairness of the wider, higher-speed pipes to all of the mobile terminals requesting bursts. Furthermore, at any given time there are only as many bursts segments being transmitted to mobile terminals as there are virtual pipes, which is in contrast to the prior art where resources are partitioned down into smaller and smaller pieces, thereby producing a very large number of low-rate bursts being simultaneously transmitted. The embodiment of the present invention, on the other hand, results in a system that uses a smaller number of wider bursts and achieves fairness using time-division techniques on the wider, higher-rate pipes rather than simultaneously driving a greater number of narrower, low-rate pipes.

DETAILED DESCRIPTION

Figure 1:
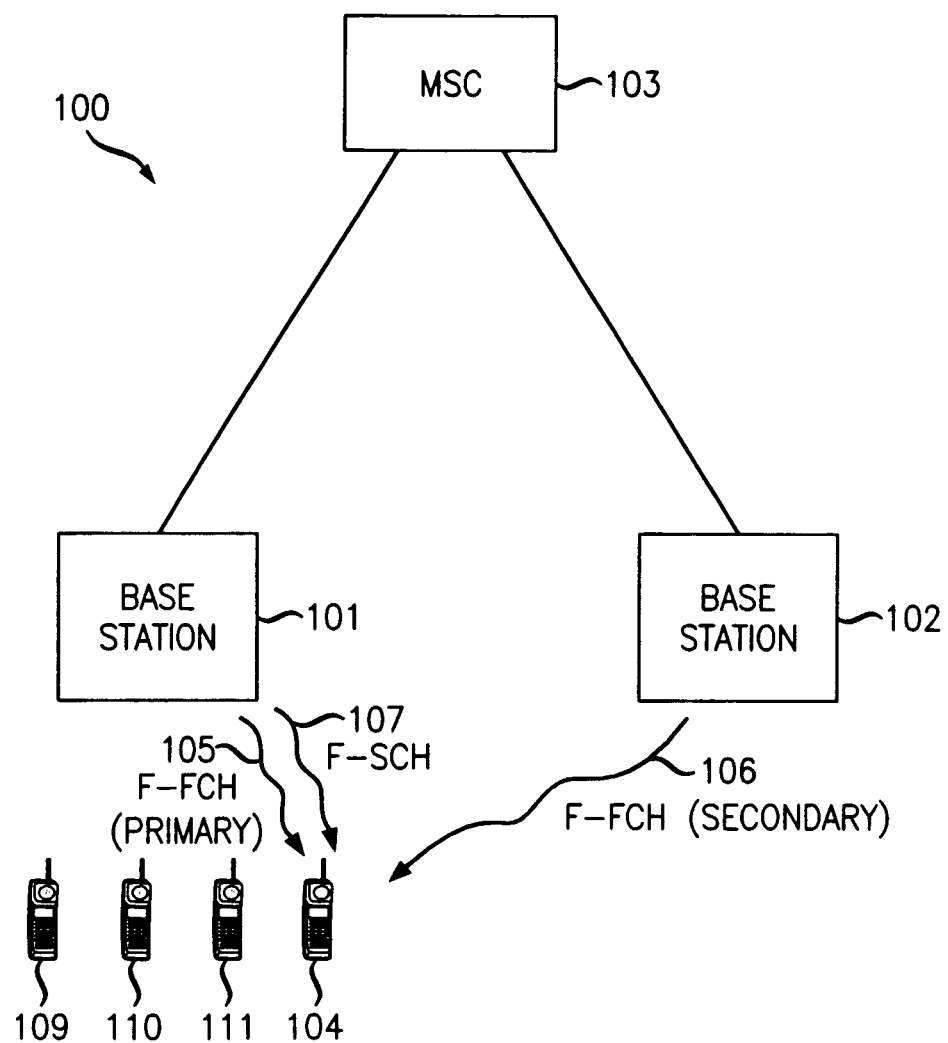
FIG. 1 is a block diagram showing a wireless network in which an embodiment of the present invention is employed.

An embodiment of the present invention is software that executes on each base station operating in a CDMA2000 wireless network. With reference to FIG. 1, base stations 101 and 102 are shown connected to MSC 103 within wireless network 100. A mobile terminal 104 is shown communicating in the forward direction with both base stations 101 and 102 on primary and secondary forward fundamental channels 105 and 106, respectively. Whereas there can be multiple fundamental channels, there is only one forward supplemental channel 107, which is reserved for the mobile terminal 104 and the other mobile terminals 109, 110, 111 that are communicating with base station 101, to receive high-speed data from that single base station 101. The fundamental channel is reserved for signaling traffic and can also transport data packets, but at lower rates than the supplemental channel. The described embodiment operates only on the forward supplemental channel. Whereas each base station in the network performs the scheduling functions to be described, high-speed data is transmitted over the forward supplemental channel 107 to mobile terminals 104, 109, 110 and 111 by a single base station 101 on a single leg.

Figure 2:
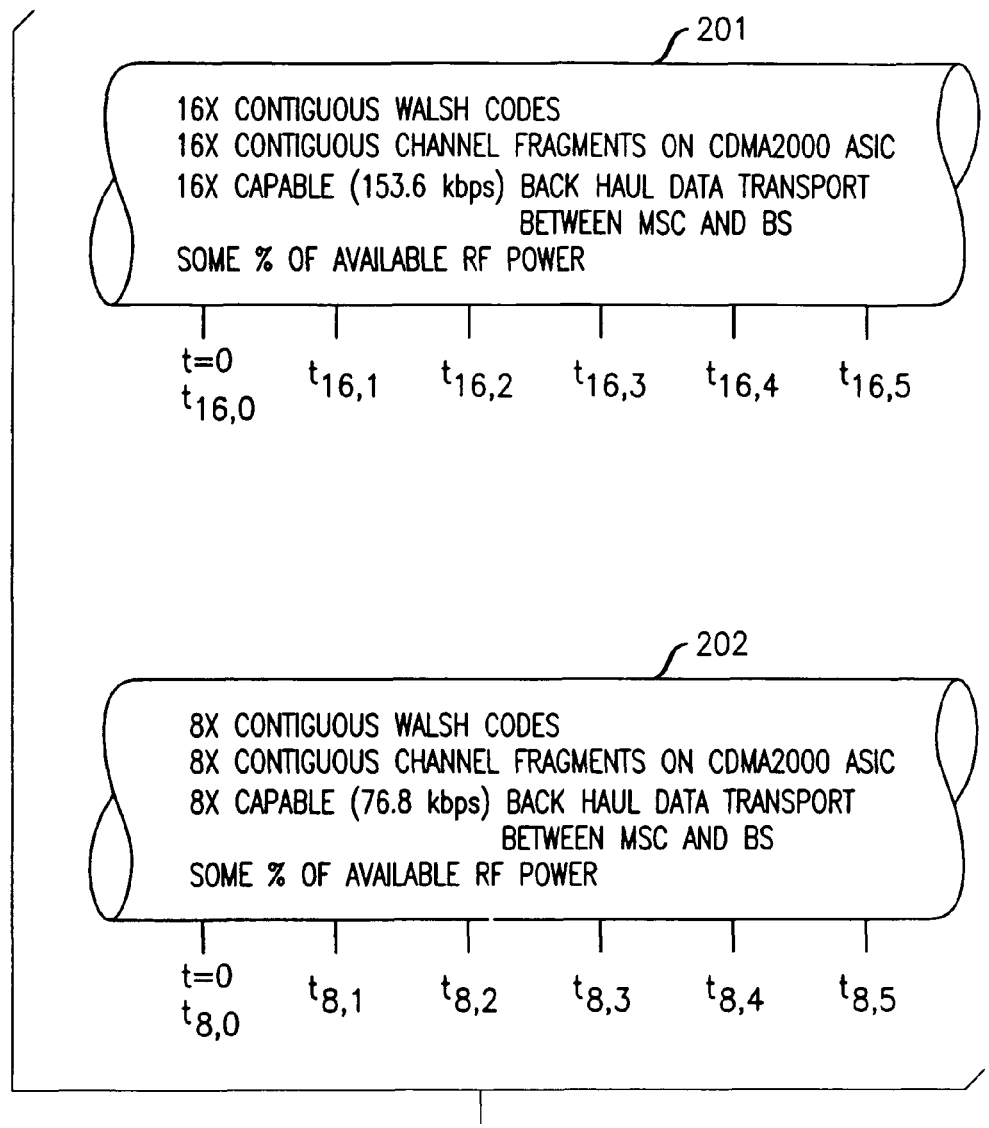
FIG. 2 shows illustrative permanent virtual pipe provisioned by the base station in the network of FIG. 1.

In accordance with an embodiment of the present invention, virtual pipes are provisioned at a base station for the transport of bursts or segments of burst of data to the mobile terminals 104, 109, 110 and 111 within that base station's service area. FIG. 2 illustrates the concept of a 16× virtual pipe 201 and an 8× virtual pipe 202. A virtual pipe consists of a set of resources that once they are allocated, remain in place. For the 16× virtual pipe 201, the resources that are allocated include: (1) 16× worth of contiguous Walsh codes; (2) 16× worth of contiguous channel fragments on a CDMA2000 ASIC; (3) 16× worth of capacity on some type of backhaul between the base station and the mobile switching center, which is typically some portion of a T1 line; and (4) some portion of available RF power, which is variable. The 8× virtual pipe 202 has ½ of these resources allocated to it by the base station (except for the RF power, which can vary) as compared to the 16× pipe 201, and can handle exactly half the data rate. As noted in FIG. 2, the virtual pipes 201 and 202 are time-divisioned into timeslots, which are used for carrying burst segments of high-speed data bursts to the mobile terminals 104, 109, 110 and 111 that are scheduled to receive such bursts. As noted above, the resources that form these virtual pipes 201 and 202, for example, are permanently assigned to their respective pipe and are never reassigned until taken down. The pipe or pipes that are provisioned at base station 101, for example, are always available, therefore, and the burst segments for the mobile terminals 104, 109, 110 and 111 are assigned timeslots on one or more of these pipes.

Figure 3:
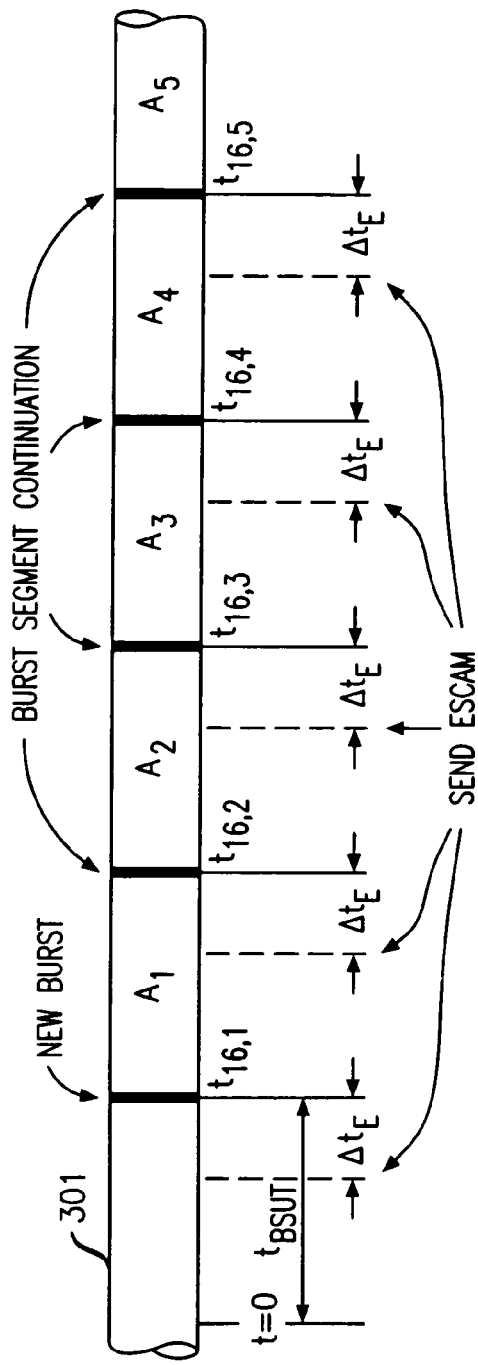
FIG. 3 illustrates the transmission of a single burst on a virtual pipe.

Once the virtual pipes have been provisioned, a data burst request is time-sliced into burst segments and assigned to potentially multiple pipes. FIG. 3 illustrates a simplest embodiment of the present invention in which a single burst is transmitted on a single virtual pipe 301. Chronologically, the base station 101 receives a forward burst request from the MSC 103, usually in response to an earlier request for some data made by the mobile terminal 104, for example. There is some delay associated with control signaling for burst setup, which is called $t_{bsut}$ (the burst setup time for a new burst). There is another delay, noted in FIG. 3, which represents the time it takes to send an ESCAM to the mobile terminal. As earlier noted, the ESCAM is a signaling message sent on a control channel, which provides the mobile terminal with the information it needs to be able to listen in on the high-speed data burst being received on a specific F-SCH. Any mobile terminal operating in accordance with the IS-2000 standards is capable of decoding and responding to the ESCAM received from the base station. The ESCAM tells the mobile terminal when to start listening, which in FIG. 3 is at $t_{16,1}$. At this time the base station 101 sends the first burst segment $A_1$ to the mobile terminal 104, for example, on the F-SCH 107 on the 16× virtual pipe 202. At some later point in time, the base station detects that another burst segment is approaching gets a trigger to send another ESCAM to mobile 104, but this time it will be for a "burst continuation". This is at a time $\Delta t_E$ before $t_{16,2}$. The detail's of how this triggered will be described below. The ESCAM tells mobile terminal 101 that a continuation to the current burst is approaching, the time it at which it will start, and which radio resources to which it should listen. At time $t_{16,2}$ base station 101 starts transmitting burst segment $A_2$. This sequence repeats until the entire high rate burst has been transmitted. For this simple embodiment, the entire burst is transmitted utilizing a single 16× virtual pipe, which also implies that it is transmitted utilizing the same set of resources. The base station 101 software does not have to exhaust any processing power in reallocating these resources, but simply has to determine how to partition the burst into segments and when to issue the burst segment continuations via ESCAMs.

Figure 4:
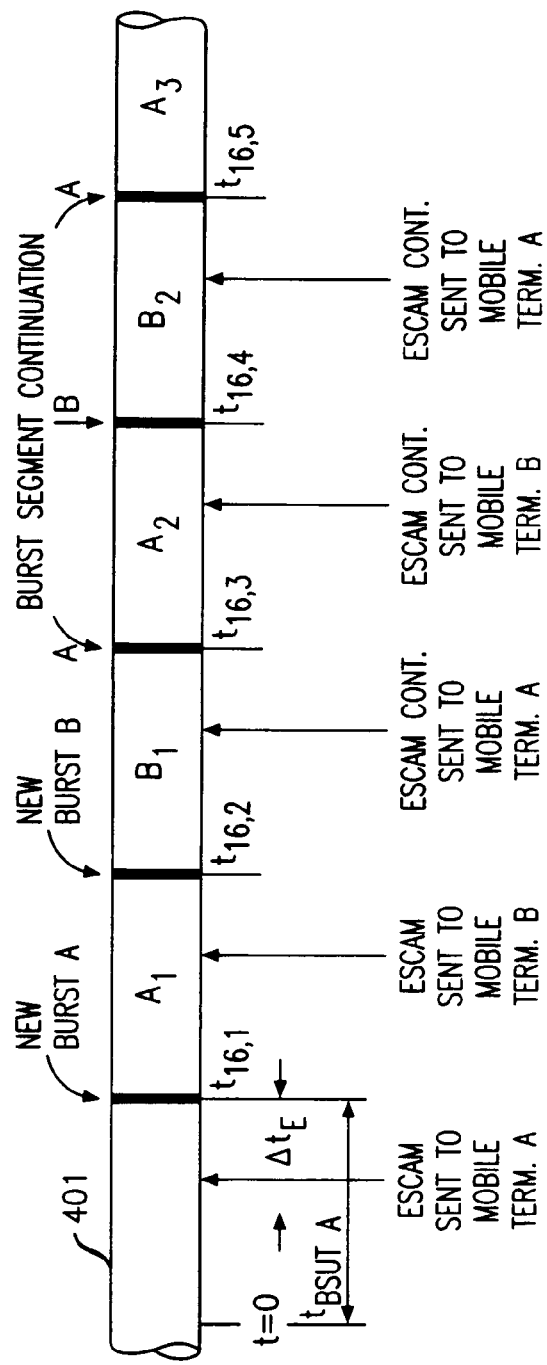
FIG. 4 illustrates the transmission of two bursts on a single virtual pipe.

FIG. 4 illustrates an embodiment of the invention when a single virtual pipe services multiple bursts directed to multiple mobile terminals. FIG. 4 illustrates the case of two simultaneous burst requests being serviced by a single virtual pipe 401. In practice, base station configurations will allow for multiple virtual pipes of varying capacity. In the scenario of FIG. 4, two different mobile terminals 104 and 109 each simultaneously requests a burst, for example. Burst A arrives at base station 101 before burst B. There is a finite burst setup time, $t_{bsutA}$, which delays the start of transfer of burst A. Burst A is scheduled first, the ESCAM is sent, and a start time of $t_{16,1}$ is chosen by base station 101. Base station 101 starts to transfer the burst segment $A_1$ to mobile terminal 104 at $t_{16,1}$ on the 16× virtual pipe 401. At this point the burst setup time for burst B has also completed but the first burst segment of burst B cannot be transmitted since the virtual pipe 401 is currently servicing burst segment $A_1$. Base station 101 triggers at the proper time and sends the ESCAM to mobile terminal 109 to which burst B is directed to synchronize the burst start time and radio resources with it. At $t_{16,2}$ base station 101 transmits burst segment $B_1$ to mobile terminal 109. At some time before $t_{16,3}$, base station 101 tells mobile terminal 101 to get ready to receive another burst segment from burst A. This form of time-division multiplexing of the 16× virtual pipe 401 allows this resource to be shared amongst both of the mobile terminals 104 and 109 that have a burst directed to them. Since base station 101 does not have to divide the resources in half, it does not have to do any further processing to reallocate these resources. Whereas such processing and reallocation may not appear to involve much processing power with only two simultaneous bursts, the processing power that would otherwise be required would be significant when ten or more simultaneous bursts are present.

Figure 5:
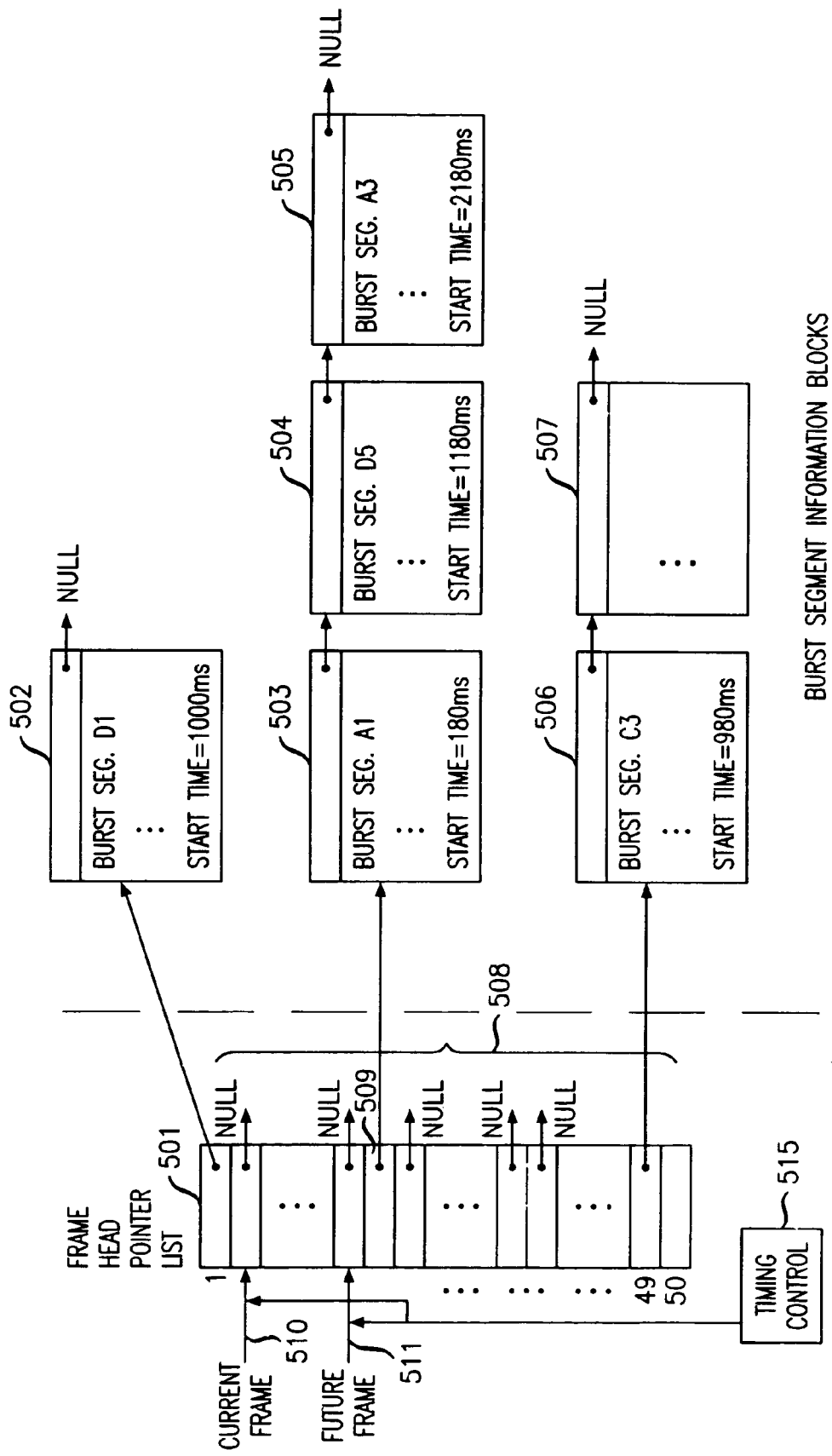
FIG. 5 illustrates a burst segment control structure that schedules and manages timeslots on a virtual pipe.

With reference to FIG. 5, a Burst Segment Control Structure 500 functions to schedule and manage timeslots on each virtual pipe, where each virtual pipe in the system has its own structure 500 allocated to it. Such a structure 500 is completely embodied in software. The structure consists of two type of elements: a frame head pointer list 501, and a collection of burst segment information blocks, for example, blocks 502, 503, 504, 505, 506, and 507. Each burst segment information block contains all the information necessary to properly place a particular burst segment on the virtual pipe with which the burst segment control structure 500 is associated in a scheduled timeslot. This information includes, for example, a burst ID, a burst segment start time, a burst segment duration. a burst information pointer to another block of data, and a next block point, where necessary, to another sibling block.

The frame head pointer list 501 consists of a plurality of frame pointers 508 that point either to a particular burst segment information block or are NULL pointers if there is no information block assigned to that frame. The frame head pointer list 501 contains one frame header pointer per frame, which is a defined time period of, for example, 20 ms. These frame head pointers are used to distribute the information held in the structure in the burst segment information blocks so that each burst segment is placed on the virtual pipe that is associated with this particular burst segment control structure at a precise time, in frame increments of 20 ms, for the example. It also contains information that is used to properly send an ESCAM to the target mobile terminal at a time that is sufficiently in advance of the time that it will be sending a burst segment to that mobile terminal. Depending upon the length of the burst to be transmitted to a target mobile terminal, a burst request from the network can result in a plurality of burst segments, thereby producing a plurality of burst segment information blocks. As will be described, these burst segments are scheduled on one or more of the provisioned virtual pipes and in a manner such that different burst segments of a particular burst are likely to be transmitted on different virtual pipes. Depending upon the scheduling of the burst segments onto each virtual pipe, the burst segment control structure 500 for each such virtual pipe contains in a burst segment information block the information necessary for transmitting a burst segment at the scheduled time.

The frame head pointers 508 are used to distribute the information held in the burst segment information blocks so that the information is properly ordered in time. The software then only scans particular portions of the information contained in the entire structure, specifically only the portions which are in its frame of interest for the given time. The number of frame head pointers contained within the list is variable and is dependent upon both the frame size that has been selected to be used in the system and a window size, where the window size is the time it takes to cycle through each frame pointer in the frame head pointer list. A window size of one second and a frame size of 20 ms results in a frame rate of 50 frames per second, or a system that has 50 frame head pointers 508 per virtual pipe. Since the frame head pointer list represents a finite-sized window in time, such as the just noted exemplary one second, the burst segment information blocks that are scheduled in the future beyond that one second window, "wrap around" within the burst segment control structure. For example, for the one second window and 20 ms frames, if a burst segment is scheduled to start exactly 2.02 seconds in the future, the burst segment information block is populated in the very next frame relative to the current frame, but is not scheduled until two wrap-arounds ahead in the future.

As a result of the wrap-around nature of the design, multiple burst segment information blocks can be associated with the same frame, but are not scheduled for transmission until times that are one-second ahead of a previous associated information block that is linked to the same frame head pointer. For example, burst segment information blocks 503, 504 and 505 illustratively containing burst segment information for burst segments $A_1$, $D_5$ and $A_3$, respectively, from burst A and D, are all linked to the same frame head pointer 509. As noted in their burst segment information blocks 503, 504 and 505, the start times of burst segments $A_1$, $D_5$ and $A_3$ are exactly one second apart from each other at exemplary start times of 180 ms, 1180 ms, and 2180 ms, respectively. As shown, burst segment information block 505 is linked to its predecessor sibling block 504, which in turn is linked to its predecessor sibling block 503, since they all reside in the same frame head pointer 509.

As each next timing event is generated by a timing control 515, a current frame pointer 510, which points to the frame currently being processed, is moved to the next frame head pointer on list 501. These timing events occur at the frame rate of 50 frames per second, or at 20 ms intervals. When the current frame pointer 510 reaches the last frame head pointer on the frame head pointer list, it then wraps around back to the beginning of the list. As the current frame pointer 510 moves from frame-to-frame in the list of frame header pointers, the software inspects all the burst segment information blocks that are associated with the pointed-to current frame and uses the start time information of each such block to decide whether to act on that block if it is currently scheduled, or not to act on the block if the block's start time indicates that it is a future block that is aligned to the current frame. If it is a future block, its start time is greater than the window size and the burst segment will not be processed during the current pass-through of frame head pointers. Rather, if it is a future block, it will be processed when current frame pointer wraps around the window, for example one second or two seconds later. If it is a future block, the window size is then subtracted from its scheduled start time so that it can be processed at a subsequent pass through the frame head pointer list. For example, when the current frame pointer 510 points to frame header 509, which points to the 503, 504 and 505 information blocks, information block 503 is serviced since its start time is 180 ms. One second is then subtracted from the start time of 1180 ms in information block 504 and from the start time of 2180 ms in information block 505. Thus, the start time of information block 504 is changed to 180 ms and the start time of block 505 is changed to 1180 ms. At the next pass of the window one second later, information block 504 is serviced since its start time is now 180 ms, and the start time of information block 505 is changed from 1180 ms to 180 ms so that it will be processed during the next wrap-around cycle.

As a burst segment is placed onto a virtual pipe for transmission to the mobile terminal to which it is directed, its respective burst segment information block is deleted from the control structure. Thus, as the information blocks are inspected for a given frame, an expired burst segment information block is erased and the frame head pointer is re-linked to the deleted block's next-in-line sibling.

Even under heavy burst loads, there are likely to be many NULL pointers in frame head pointer list 501. As noted, a NULL pointer indicates that there is no change in the burst activity at that frame offset and thus no change in the operation of the virtual pipe has to be performed at that frame time. For the exemplary system that utilizes 50 frames per window, even if 20 burst segments are scheduled for the associated virtual pipe, at least 30 frame headers are NULL since many burst segments can be wrapped into the same frame.

While the current frame pointer 510 points to a current frame that may or may not link to a burst segment information block that will cause a change of burst activity on the virtual pipe, a future frame pointer 511 simultaneously points to another frame in the frame head point list that the current frame pointer 510 will not reach until some time in the future. That future time is equal to the frame offset between the current and future frame pointers. As timing control 515 generates a timing event that moves current frame pointer 510 to the next frame head pointer, the future frame pointer 511 is moved in parallel to its next sequential frame head pointer. This future frame pointer 511 is used to properly schedule transmission of an ESCAM, which needs to be received by the mobile terminal a finite time before the mobile terminal is prepared to receive the actual burst segment from the base station. That finite time, described above, is illustrated in FIG. 3 as $\Delta t_E$. For an exemplary system in which $\Delta t_E$ is 120 ms and with a frame size of 20 ms, the frame offset of the future frame pointer 511 from the current frame pointer 510 is six frames. Thus, as the current frame pointer 510 sequences from frame-to-frame in the frame head pointer list, the future frame pointer 511 sequences in parallel from frame-to-frame six frames ahead. When the future frame pointer 511 points to a pointer associated with a burst segment information block whose start time is less than the window size, an ESCAM for that burst segment is generated. That ESCAM is thus transmitted to the mobile terminal six frames, or 120 ms, ahead of the time at which the current frame pointer 510 will eventually reach that same frame head pointer and when that same burst segment will be transmitted on the virtual pipe.

Figure 6:
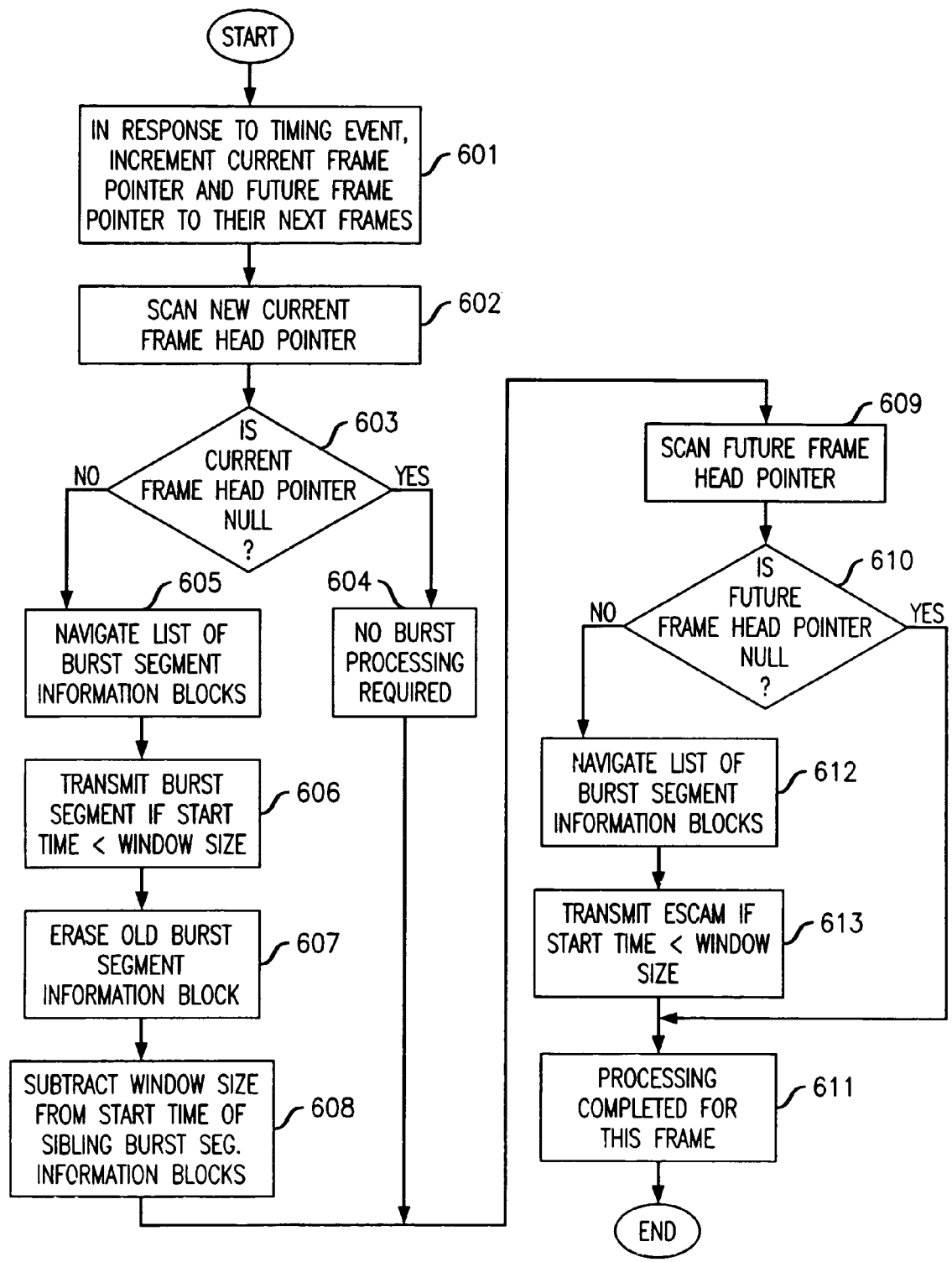
FIG. 6 is a flowchart detailing the operation of a data burst driver for each virtual pipe that is provisioned by the base station.

FIG. 6 is a flowchart detailing the operation of the data burst driver for each virtual pipe that is established by the base station. The data burst driver associated with each virtual pipe is time-synchronized and wakes up on every frame (i.e., every 20 ms). The data burst driver is responsible for acting with precise timing constraints on the information present in the virtual pipe's burst segment control structure that was described above, and for removing the burst segment information blocks when a burst segment has completed. At step 601, in response to a timing event generated by the timing control, the current frame pointer and future frame pointer are incremented to their respective next sequential frames in the frame head pointer list. For the described embodiment, such a timing event occurs every 20 ms. At step 602, the new current frame head pointer is scanned. At step 603, a determination is made whether that current frame head pointer is NULL. If it is NULL, then no burst processing is required at this current frame (step 604) and processing on the future frame pointer proceeds, as will be described. If the current frame pointer is not NULL, then, at step 605, the list of burst segment information blocks associated with that current frame are navigated. At step 606, a burst segment is sent on the virtual pipe if a burst segment information block that is associated with that frame has a start time that is less than the framing window size (e.g., one sec). At step 607, the old burst segment information block linked to the current frame is erased and, at step 608, the window size is subtracted from the start time for each sibling of the burst segment block that was just processed. Once the burst segment associated with the current frame has been processed, a burst segment information block that is associated with the frame to which the future frame pointer points is processed. Thus, at step 609, the future frame head pointer is scanned. At step 610, a determination is made whether that future frame head pointer is NULL. If it is NULL, then processing is complete for the frame (step 611). If it is not NULL, then, at step 612, the list of burst segment information blocks associated with that frame head pointer are navigated. At step 613, an ESCAM is sent if the start time of any such burst segment information block is less than the framing window size. At that point, at step 611, processing has been completed for this frame.

Figure 7:
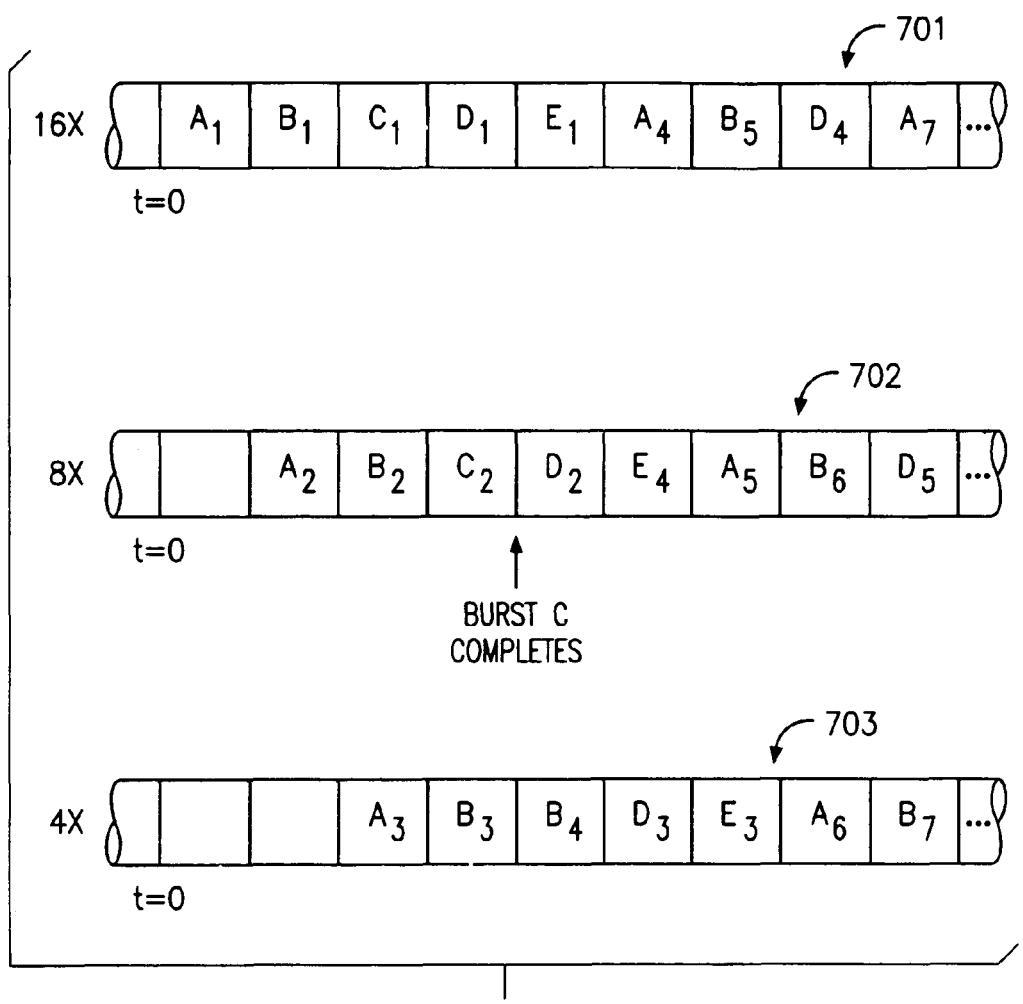
FIG. 7 shows three virtual pipes at different rates servicing multiple simultaneous bursts.

In fully loaded system, typically more bursts than there are virtual pipes need to be simultaneously serviced. These bursts are scheduled onto the multiple virtual pipes in a manner that places the first burst segment of a burst on the widest virtual pipe. Accordingly, in a heavily loaded system, each burst is fairly allocated some resources on the widest, fastest rate pipe. FIG. 7 shows a 16× virtual pipe 701, a 8× virtual pipe 702 and a 4× virtual pipe 703 together servicing five simultaneous bursts labeled A, B, C, D and E. Each of these bursts is divided into burst segments, each separately notated in the Figure with a subscript. Burst $A_1$ is illustrated as starting in the 16× virtual pipe 701, followed by burst segments $B_1$, $C_1$, $D_1$ and $E_1$. After these burst segments are scheduled onto virtual pipe 701 by means of that pipe's burst segment control structure, other burst segments are scheduled onto virtual pipes 702 and 703 by means of each of those pipe's respective burst segment control structure. Thus, as can be noted, burst segment $A_2$ is scheduled for transmission on the 8× virtual pipe 702 at a time after burst segment $A_1$ has completed transmission since the mobile terminal to which that burst A is directed is capable of receiving only one burst segment at a time. Before burst $A_1$ terminates on 16× pipe 701, the burst segment control structure for 8× virtual pipe 702 processes a burst segment information block that tells the system to send an ESCAM to the mobile terminal that is currently receiving burst segment $A_1$. This ESCAM informs that mobile terminal that burst segment $A_2$ will start at some later time with a different rate and with a new set of radio resources than were being used to receive burst segment $A_1$.

By allocating resources on the widest, highest rate pipe to accommodate at least the first burst segment of each burst, the plurality of currently active bursts are able to share the wider higher rate resources fairly. As can be noted in FIG. 7, burst delivery is then cycled through the other lower-rate available virtual pipes in a round-robin manner, transmitting the different burst segments of a burst at different rates when the system is heavily loaded, but still being capable of transmitting the burst segments at the higher rates when the system is lightly loaded.

Advantageously, the system has enough information to fill timeslot holes or double up burst segments for a given burst. For example, it can be noted that burst C, which only consists of burst segments $C_1$ and $C_2$, completes with the sending of burst $C_2$ on the 8× virtual pipe 702 at the same time that burst segment $B_3$ is being sent on 4× virtual pipe 703. With the completion of burst C, there is no burst segment $C_3$ to follow burst segment $B_3$ in the next timeslot on virtual pipe 703, which would otherwise produce a hole in this next timeslot. The scheduler, however, is able to calculate this in advance and schedule a double segment from burst B (i.e., burst segment $B_4$ to follow burst segment $B_3$) on the 4× virtual pipe 703 to fully utilize this pipe. These scheduling decisions can be performed a priori because the scheduler has access to all the burst segment information by navigating the burst segment control structures.

Figure 8:
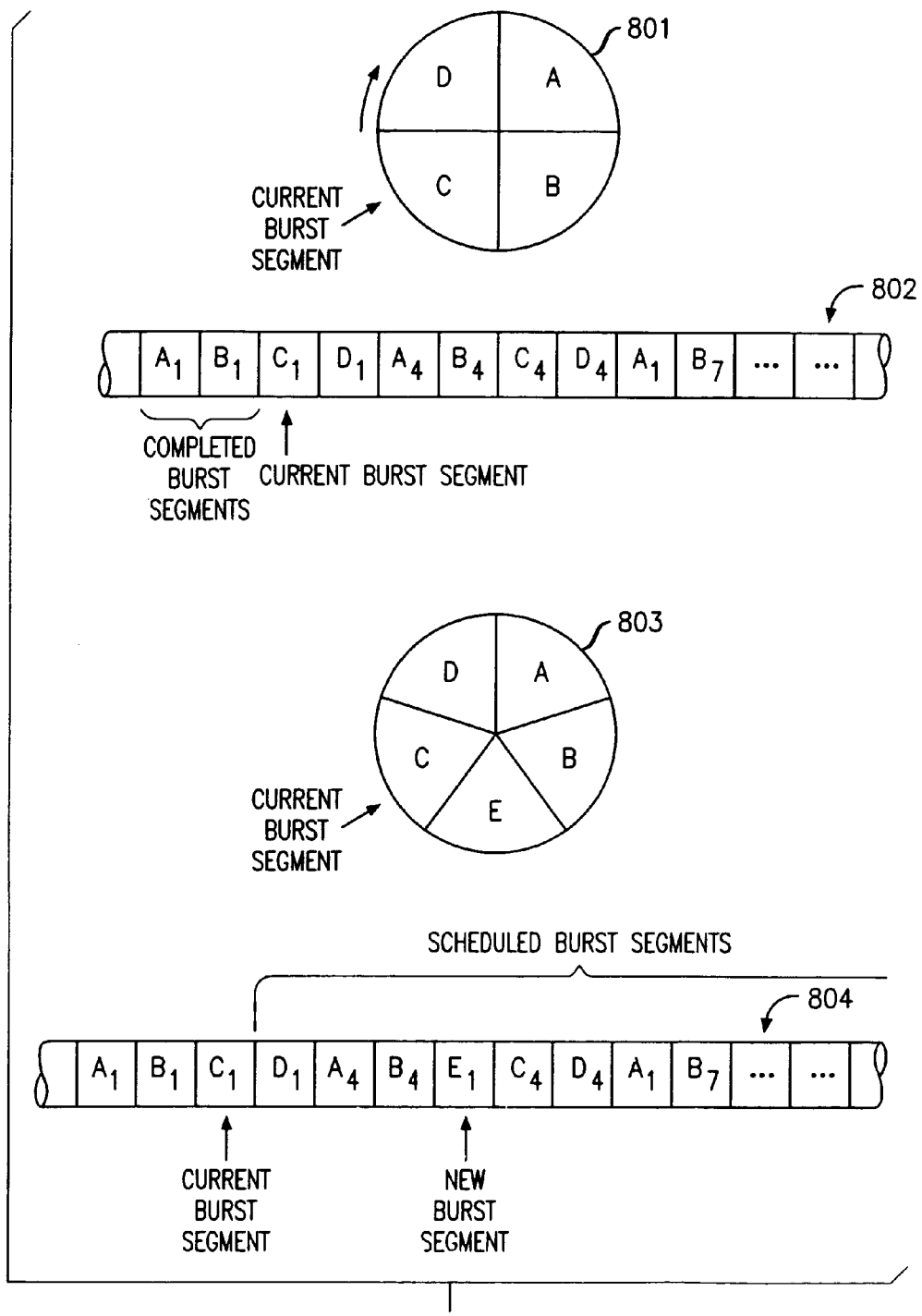
FIG. 8 shows how new bursts are scheduled on a virtual pipe.

With reference to FIG. 8, bursts are scheduled on the widest virtual pipe in a round-robin fashion, which is depicted in the Figure with a "pizza" arbiter 801. Pizza arbiter 801 contains four active bursts A, B, C and D, which are scheduled burst segment-by-burst segment onto 16× virtual pipe 802. For illustration purposes, the current burst segment on virtual pipe 802 is burst $C_1$. Transmission of burst segments $A_1$ and $B_1$ are shown to have preceded transmission of burst segment $C_1$. Also burst segments $D_1$, $A_4$, $B_4$, $C_4$, $D_4$, $A_7$ and $B_7$ are scheduled in future slots. Intervening burst segments are transmitted on other virtual pipes, not shown. While the current burst segment $C_1$ is being transmitted, the base station receives a new burst request for burst E. The scheduling software schedules the first burst segment, $E_1$, of this new burst onto the widest pipe, the 16× pipe. The pizza arbiter 801 is utilized to select a timeslot into which burst segment $E_1$ is scheduled. Specifically, a "slice" for burst E is inserted in the arbiter as far away from the current burst segment without wrapping around. Since a burst segment from burst C is currently being transmitted, with bursts segments from bursts D, A and B scheduled to follow, the furthest slot is after a burst segment from burst B just before another burst segment from burst C. The arbiter 803 shows a burst segment from burst E inserted in this position. The scheduler then scans the burst segment control structure for this 16× virtual pipe and determines a start time for burst segment $E_1$. It is assgined the slot previously reserved for burst segment $C_4$ and therefore is given its start time, as noted on the modified 16× virtual pipe 804. The start times of all burst segments that are scheduled starting after burst segment $C_4$ are thus shifted by a time equal to the duration of the inserted burst segment $E_1$. Also, the burst segments that have already been scheduled on other lower-rate pipes with a start time after the start time of burst segment $E_1$ are also shifted. For example, if burst segment $C_5$ had been assigned on a lower-rate pipe at a time that followed burst segment $C_4$, its start time needs to be shifted on that pipe to re-align with the end of the time-shifted burst segment $C_4$ on the 16× virtual pipe 804. This is necessary since, as afore noted, burst segments to the same mobile terminal cannot overlap in timeslots on any of the pipes and have to be separated in time since the mobile terminal can receive only from one virtual pipe at any time.

Only a single round-robin pizza arbiter is required regardless of the number of virtual pipes. The arbiter is needed only for the widest, highest rate pipe where the first burst segment of each new burst is scheduled. The next burst segment of the new burst is then placed on the next highest rate pipe and is scheduled into a timeslot following completion of first highest-rate timeslot. This cascades onto the available pipes until a next burst segment wraps back into the highest-rate pipe, if necessary.

Figure 9:
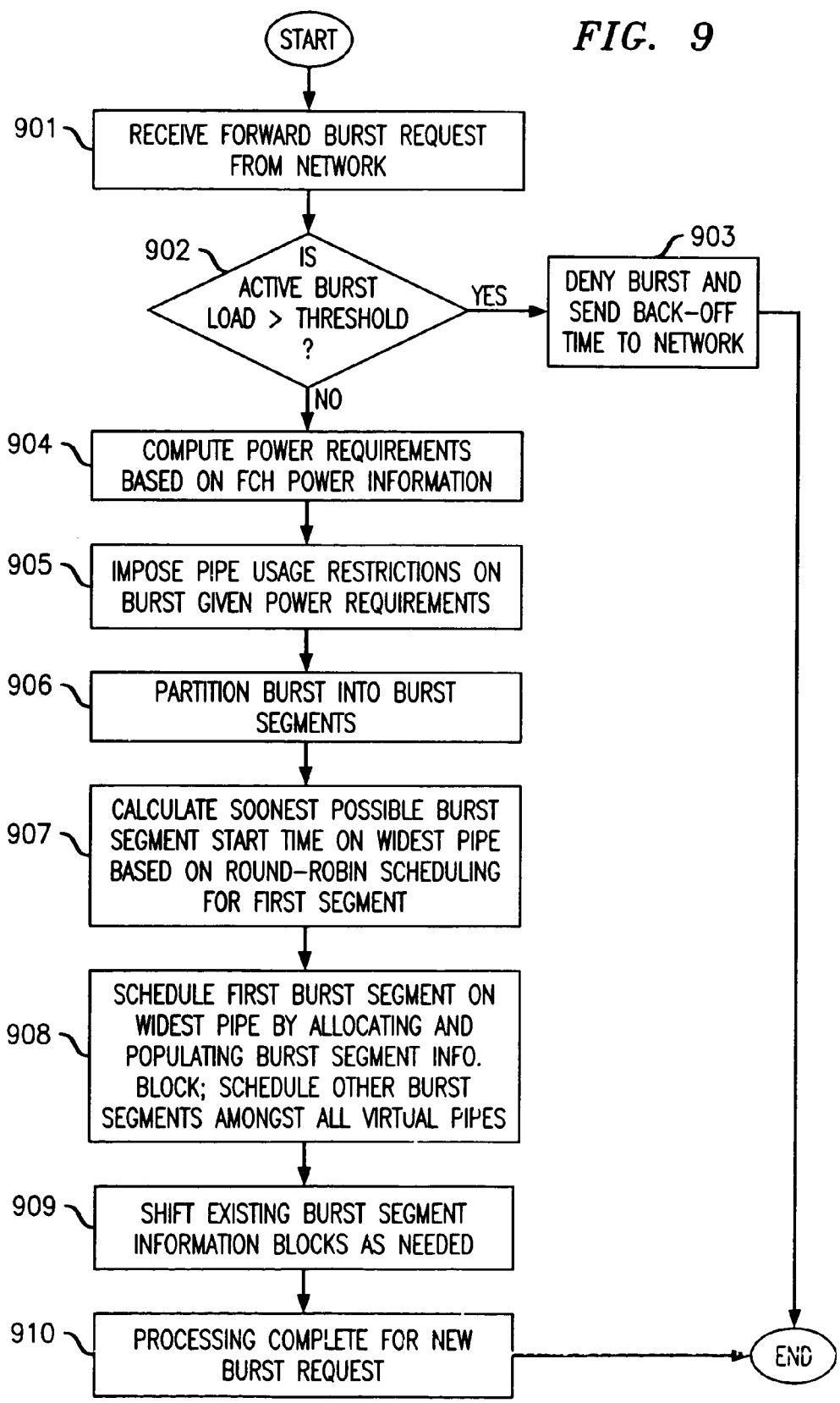
FIG. 9 is a flowchart showing how a burst scheduler schedules bursts segments on a virtual pipe.

FIG. 9 is a high-level flowchart of the burst scheduler, which processes forward burst requests from the network. At step 901, the base station receives a forward burst request from the network. The burst is directed to a particular mobile terminal in the base station's service area. At step 902, the current active burst load at the base station is compared against a threshold. If, at step 903, the current active burst load is greater than a threshold, the burst is denied and a back-off time is sent to network indicating when the burst request should be reattempted. If the active burst load is less than a threshold, then, at step 904 power requirements are computed based on FCH power information. At step 905, based on the power requirements, pipe usage requirements can be imposed on a power-hungry burst that is destined to a mobile terminal that is far from the base station in order to restrict such a burst to the lower rate virtual pipes. At step 906, the burst is partitioned into segments. At step 907, the soonest possible burst segment start time on the widest, highest rate virtual pipe in the system for the first burst segment is calculated based on round robin scheduling. At step 908, the first burst segment is scheduled on the widest virtual pipe by allocating and populating a burst segment information block. The remaining burst segments are then scheduled amongst all the virtual pipes, as needed, in a round robin fashion. At step 909, existing burst segments information blocks are shifted, as needed. Thus, as described above, if the scheduler needs to shift some of the burst segments that have already been given a start time on the widest pipe, it does so and modifies, as it needs to, any burst segment information block as long as an ESCAM has not already been sent for such burst segment. The shifting of burst segments is likely to result in burst segment information blocks being moved to new frames in the control structure since shifting will impact all the burst segments that are scheduled after the insertion point of the new burst segment. Accordingly, the software navigates the control blocks and updates all affected burst segment information blocks. As described above, this cascades into the other virtual pipe control structures, which have burst segments scheduled thereon for the same affected bursts. At this point, at step 910, once all shifting has been performed, the burst scheduler has updated the burst information control blocks for the existing burst segments, as required, and thus has completed processing for the new burst request. The information in the burst segment control structures for each virtual pipe is thus now up-to-date and contains the latest burst request along with the updated information for the previously existing burst segments. The scheduler then waits for the next new burst request.

Figure 10:
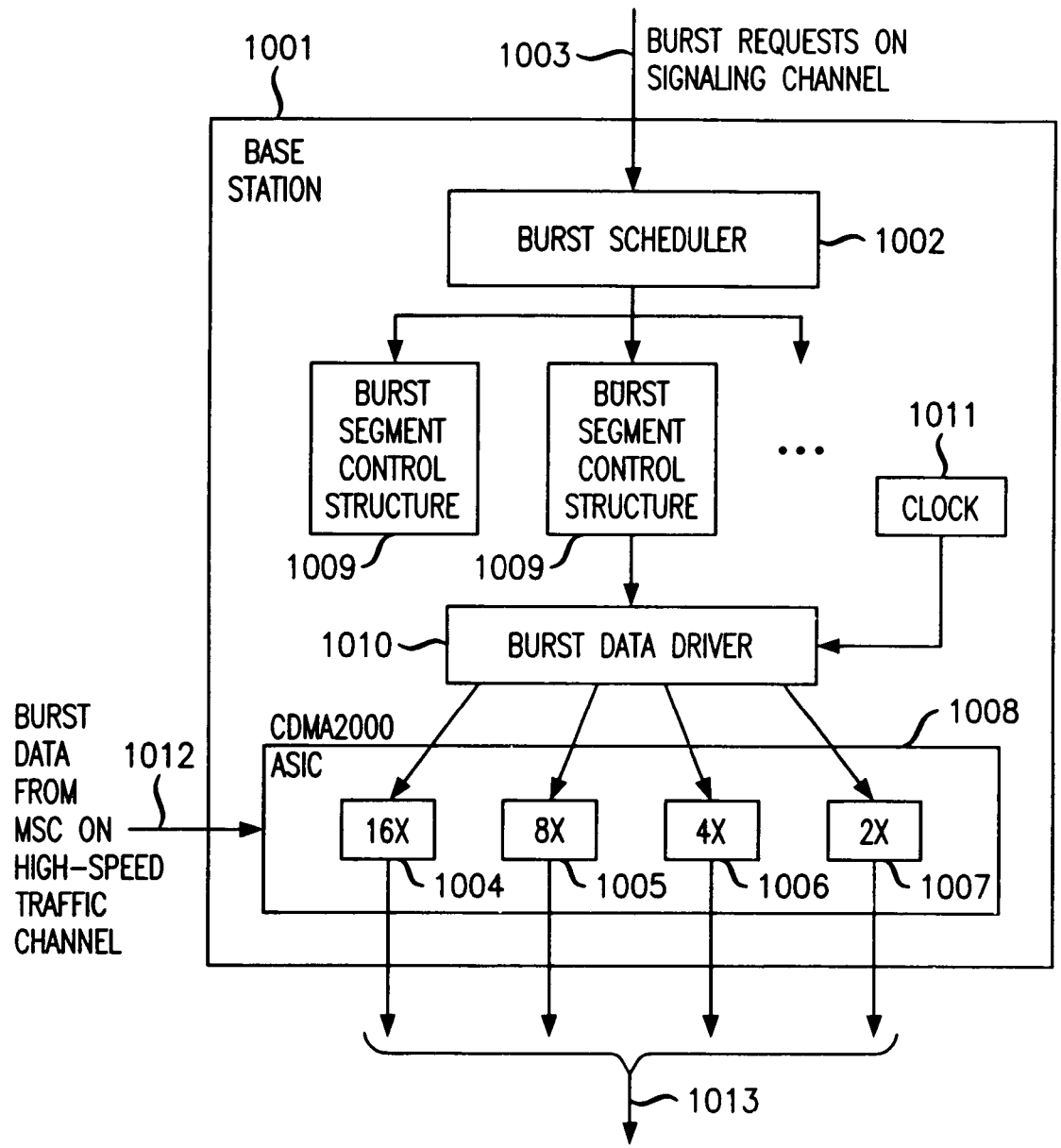
FIG. 10 is a high-level block diagram of a base station in accordance with an embodiment of the present invention.

With reference to the block diagram of a base station 1001 in FIG. 10, the interaction between the various previously described software and hardware components is illustrated. The burst scheduler 1002, in response to burst requests received over a control channel 1003 from the MSC (not shown), divides each received burst into burst segments according to the burst length indicated in the burst request. The burst scheduler 1002 then schedules each burst segment on one of the virtual pipes that have previously been provisioned at the base station. For illustrative purposes only, a 16× virtual pipe, an 8× virtual pipe, a 4× virtual pipe, and a 2× virtual pipe are shown provisioned at base station 1001, which is represented as resources 1004, 1005, 1006, and 1007, on the base station's CDMA2000 ASIC 1008. For each burst segment, the burst scheduler 1002 populates a burst segment information block within the particular burst segment control structure 1009 that is associated with the virtual pipe on which that burst segment has been scheduled. For this example, therefore, there are four burst segment control structures 1009, one each associated with each of the provisioned virtual pipes (only two of such structures are shown in the figure). As previously described, each burst segment information block is populated with information relating to the associated burst segment and is linked to a specific frame on the frame head pointer list within the burst segment control structure according to that burst segment's scheduled transmission time. The burst data driver 1010, in response to timing events driven by a clock 1011 at the exemplary 20 ms rate, reads the burst segment information blocks within each burst segment control structure 1009. When it encounters a "live" burst segment information block, it transmits the associated burst segment that has arrived at ASIC 1008 over high-speed traffic channel 1012. That burst segment is transmitted at its scheduled time to its destined mobile terminal over the F-SCH 1013 via the particular virtual pipe 1004-1007 on which it has been scheduled. After burst data driver 1010 processes a live burst segment information block within a burst segment control structure 1009, it deletes that now dead block and adjusts the scheduled burst segment start times of any sibling burst segment information blocks. As previously described, that enables a sibling burst segment information block to be processed on a subsequent pass through that burst segment control structure's frame head pointer list. Further, when the burst data driver 1010 encounters a burst segment that is scheduled to be transmitted at a predetermined time in the future, it sends an ESCAM to the mobile terminal to which that future burst segment is directed to prepare that mobile terminal to receive that burst segment.

Although described in conjunction with a CDMA2000 system, the present invention could be used in any other type of code division multiplexed wireless communications system in which data is transmitted in bursts to mobile terminals.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method at a base station in a code division multiple access wireless network that transmits data bursts on a high-speed forward channel, the method comprising the steps of:
providing at least one permanent virtual pipe comprising a plurality of different width virtual pipes on the high-speed forward channel for transmission of the data bursts, at least one of the plurality of different width permanent virtual pipes being wider than another of the virtual pipes;
scheduling transmission of burst segments of the data bursts on the at least one permanent virtual pipe in a round-robin manner among different data bursts, at least one burst segment of each data burst being scheduled for transmission on the widest virtual pipe; and
transmitting the burst segments on the at least one virtual pipe in accordance with the scheduling.

2. The method of claim 1 wherein the step of providing at least one permanent virtual pipe comprises provisioning predetermined channel resources to the at least one virtual pipe.

3. The method of claim 2 wherein the predetermined channel resources comprises a predetermined number of contiguous Walsh codes and a predetermined amount of contiguous real estate on the base station's CDMA ASIC.

4. The method of claim 1 further comprising: scheduling transmission of the burst segments of a data burst amongst the different width virtual pipes in a round robin manner.

5. The method of claim 1 wherein the base station operates in accordance with CDMA2000 standards and the virtual pipes are provided at widths chosen from among: 19.2 kbps, 38.4 kbps, 76.8 kbps and 153.6 kbps.

6. The method of claim 1 further comprising the step of: transmitting an ESCAM a predetermined time interval before transmitting a burst segment, the ESCAM providing information for receiving the burst segment.

7. A base station in a code division multiple access wireless network that transmits data bursts to mobile terminals on a high-speed forward channel, the base station comprising:
means for providing at least one permanent virtual pipe comprising a plurality of different width virtual pipes on the high-speed forward channel, at least one of the plurality of different width permanent virtual pipes being wider than another of the virtual pipes;
scheduling means for scheduling transmission of burst segments of the data bursts on the at least one permanent virtual pipe in a round-robin manner among different data bursts, at least one burst segment of each data burst being scheduled for transmission on the widest virtual pipe; and
means for transmitting each burst segment on the at least one virtual pipe in accordance with when it is scheduled for transmission.

8. The base station in accordance with claim 7 further comprising a burst segment control means associated with the at least one permanent virtual pipe for storing when each burst segment is scheduled for transmission, the transmitting means transmitting a burst segment in response to a signal from said burst segment control means to transmit the burst when it is scheduled.

9. The base station of claim 7 wherein the means for providing at least one permanent virtual pipe comprises a provision of predetermined channel resources to the at least one virtual pipe.

10. The base station of claim 9 wherein the predetermined channel resources comprises a predetermined number of contiguous Walsh codes and a predetermined amount of contiguous real estate on a CDMA ASIC.

11. The base station of claim 7 wherein the scheduling means schedules transmission of the burst segments of a data burst amongst the different width virtual pipes in a round robin manner.

12. The base station of claim 7 wherein the base station operates in accordance with CDMA2000 standards and the virtual pipes are provided at widths chosen from among: 19.2 kbps, 38.4 kbps, 76.8 kbps and 153.6 kbps.

13. The base station of claim 7 wherein the transmitting means transmits an ESCAM a predetermined time interval before transmitting a burst segment, the ESCAM providing information for receiving the burst segment.

* * * * *